Patented Feb. 9, 1937

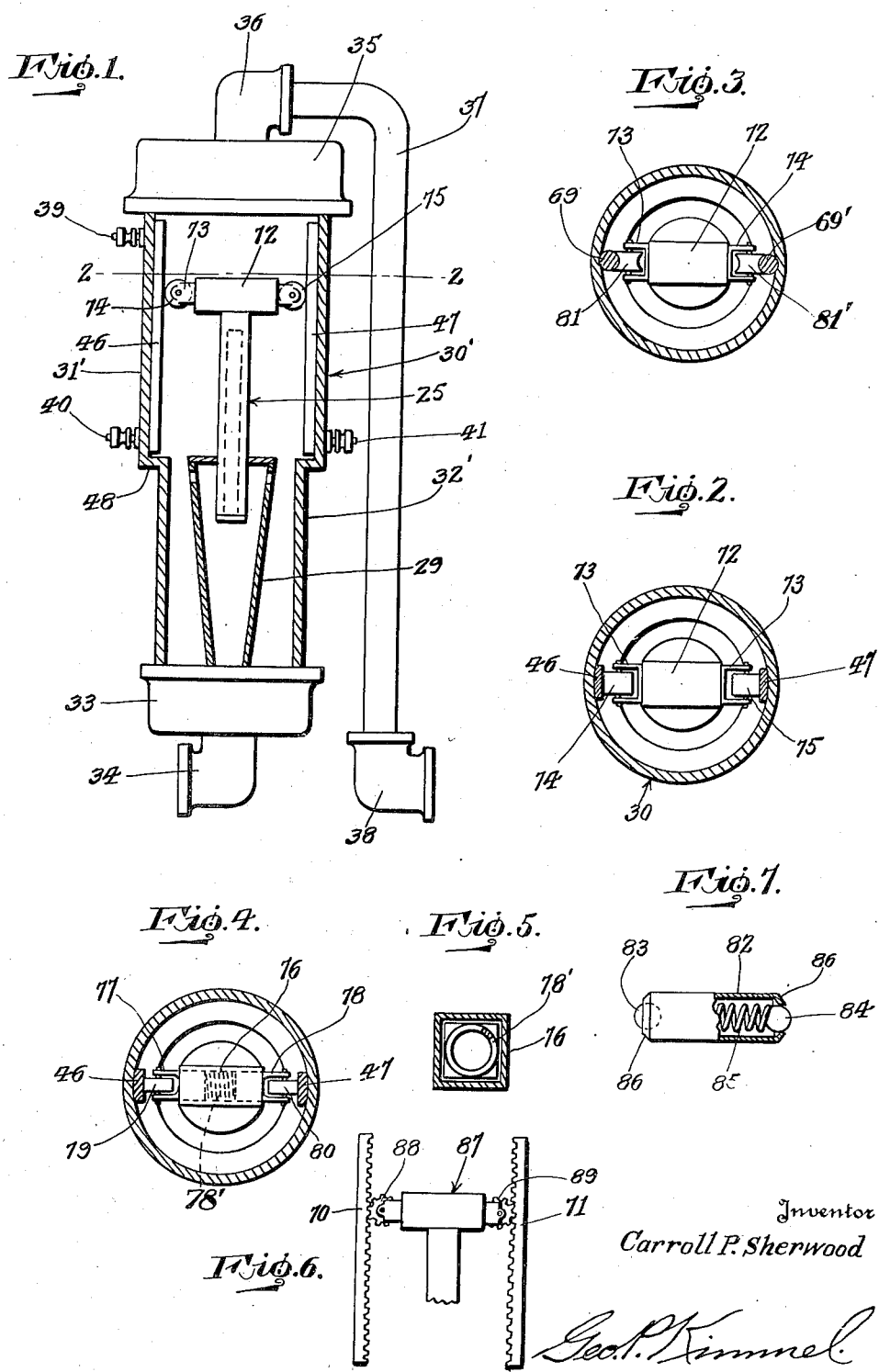

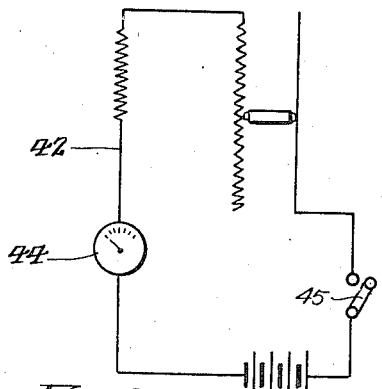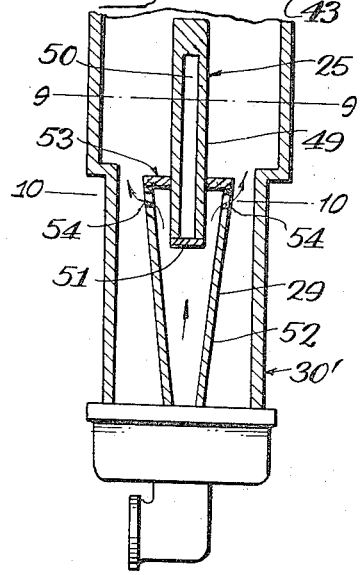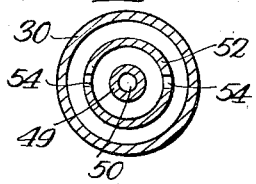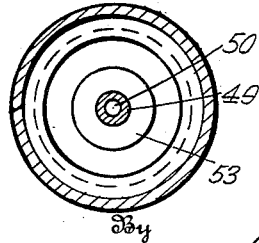

2,070,374

UNITED STATES PATENT OFFICE 2,070,374

FLOW METER

Carroll P. Sherwood, Camden, N. J., assignor to American Gasaccumulator Company, Elizabeth, N. J., a corporation of New Jersey Application December 10, 1931, Serial No. 580,160

7 Claims. (Cl. 73—209)

My invention relates to a flow meter designed primarily for use in connection with motor vehicles but it is to be understood that a flow meter in accordance with my invention may be employed in any connection for which it is found applicable.

The essential objects of my invention are to accurately indicate at all times variations in rate of fuel consumed irrespective of climatic conditions or temperatures of the flowing fluid; to control the speed of, and the pressure head required to operate meters for indicating a change in rate of, and rate of flow of fluid; to increase the speed of response to changes in rate of flow for indicating any change in rate of, and rate of flow in fluids; to decrease the pressure head required to operate the meter for indicating a change in rate of, and rate of flow in fluids; to control the variation in size of the measuring orifice due to temperature or other climatic variations resulting in accurately indicating changes in the rate of, and rate of flow of the fluid; to minimize the variation of the measuring orifice size due to temperature or other climatic conditions to accurately indicate changes in rate of, and rate of flow in fluids; to regulate the average or relative specific density or buoyancy of a movable, fluid flow rate indicating controlling member regardless of its composition, size, shape and specific gravity, before or after immersion and upon which the fluid acts to produce a change in the position of such member in response to a change or changes in the rate of flow of the fluid whereby accurate indicating is had; to provide a movable, fluid flow rate indicating member of such weight as to start to lower immediately upon the decreasing of the flow a slight bit and to start to rise as soon as the flow increases a slight bit with minute pressure differential; to provide a movable, fluid flow rate indicating controlling member which is instantaneously responsive to a slight decrease or increase in the flow; and to attain these ends in a strong, durable, compact, thoroughly efficient, accurately metering, and comparatively inexpensive structure.

To the above ends essentially and others which may hereinafter appear my invention consists of such parts and combination of parts as fall within the scope of the invention as claimed.

In the drawings:

Fig. 1 is a sectional elevation of a flow meter in accordance with my invention.

Figure 2 is a section on line 2—2 Figure 1.

Figure 3 is a detail in sectional plan illustrating a modified form of contactor and resistor strip.

Figure 4 is a view similar to Figure 3 of still another modified form of contactor.

Figure 5 is a cross sectional view of the form of contactor shown in Figure 4.

Figure 6 is a fragmentary view in elevation of another modified form of contactor, resistor strip and contact strip.

Figure 7 is an elevation, partly in section of still another modified form of contactor.

Figure 8 is a fragmentary view in vertical section illustrating the movable, flow rate indicating controlling member and the intake tube of the form shown in Figure 1.

Figure 9 is a section on line 9—9 Figure 8.

Figure 10 is a section on line 10—10 Figure 8.

Figure 11 is a view similar to Figure 8 of a modified form of movable, flow rate indicating controlling member and intake tube.

Figure 12 is a section on line 12—12 Figure 11.

Figure 13 is a sectional elevation of a weighted buoyant member.

Figure 14 is a diagrammatic view of the electrical circuit in connection with a remotely positioned electrically operated indicator and including a rheostat.

Figure 15 is a view similar to that of Figure 14 of the circuit of a potentiometer.

Figure 16 is a front elevation of an electrically operated indicator located at a point remote from the contactor.

With reference to Figures 8 and 11, there is illustrated movable, fluid flow rate indicating controlling members 25 and 26, respectively, and stationary fluid intake tubes 29 and 30, respectively. In Figure 1 of the drawings, the movable member and intake tube correspond in form to that shown in Figure 8 and are designated 25 and 29 respectively.

Each intake tube coacts with a movable member and is arranged in a tubular housing having its upper portion of greater diameter than its lower portion. The housings shown by Figures 1, 8 and 11, are of like form and each is indicated at 30'. The intake tube is spaced from the upper right wall of the housing so as to form a reservoir for stagnant fluid between the housing wall and the intake tube and around the cooperating metering elements, that is, around the intake tube throughout the extent of movement of the orifice changing portion of the movable member. This arrangement serves to insulate the metering elements from high temperatures such as those to which the flow meter is subjected when used beneath the hood of an automobile engine.

Each housing has its enlarged portion indicated at 31' and its reduced lower portion at 32'. Secured to the lower end of housing 30' is a closure 33 to which the lower end of the intake tube is attached. The closure 33 has depending therefrom a coupling 34 into which opens one section, not shown, of a fluid feed or conducting line. The coupling 34 communicates through closure 33 with the intake tube. The upper end of housing 30' has secured thereto a closure 35 having extended therefrom a coupling 36 which is attached to the section 37 of the fluid feed or conducting line. The section 37 is attached to a coupling 38, which in turn is connected with the carburetor not shown. The coupling 36 communicates with the interior of the housing 30' through the closure 35.

Each housing 30' has attached to one side of its upper portion a pair of superposed spaced binding posts 39, 40 and near the bottom of the opposite side thereof a binding post 41. The arrangement of the binding posts is shown in Figure 1 and they are to have attached thereto the circuit connections 42 which lead from the electrical source 43 and to the electrically operated indicator 44 arranged at the desired point remote from the housing 30'. A switch 45 is interposed between the circuit connections 42.

With reference to Figures 1 and 2 there is arranged lengthwise of and within the upper portion 31' of housing 30' a flat, electrical resistance strip 46 which is attached to binding posts 39, 40 and insulated from housing portion 31'. Arranged lengthwise of and within the upper portion 31' of housing 30' is a flat conducting strip 47 which is attached to binding post 41 and insulated from housing portion 31'. The strips 46, 47 are parallel and arranged at opposite sides of housing portion 31', and the bottom of the latter provides housing 30' with an annular peripheral shoulder 48 above which the strips 46, 47 are positioned.

The movable, fluid flow rate indicating controlling member 25 shown in Figures 1 and 8 comprise a body part 49 of suitable length, of circular cross section and of the desired diameter. The body part 49 is formed with a lengthwise extending chamber 50 the upper end of which terminates adjacent the upper end of body part 49. The lower end of chamber 50 is closed by a disc 51. The intake tube 29 shown in Figures 1, 8, 9 and 10 includes a body part 52 which gradually increases in diameter from its lower to its upper end, and has mounted on its upper end a washer 53 having its inner diameter corresponding to the outer diameter of member 25, the latter passing through the washer and into tube 29. The body part 52 in proximity to washer 53 is formed with spaced outlet ports 54.

Referring to Figures 11 and 12 the movable member 26 includes a body part 55 which gradually increases in diameter from its lower to its upper end and has its upper portion lengthwise chambered as at 56. The upper end of chamber 56 is closed by a disc 57. The tube 30 is of uniform diameter from end to end and has the lower portion of member 26 extended into its upper end. Secured to the lower end of member 26 as well as projecting laterally therefrom is a retarder 58 of a diameter corresponding to the inner diameter of tube 30. The retarder 58 has spaced incurved edge parts 59 forming in connection with tube 30 fluid passages 60.

The electrical resistance strip can be of the form indicated at 46 Figures 1 and 2 or of circular cross section, as indicated at 69 Figure 3, or in the form of a rack indicated at 70 Figure 6. The conducting strip can be of the form indicated at 47 Figures 1 and 2 or in the form of a rack indicated at 71 Figure 6. Irrespective of the structural form of the resistance and conducting strips, they are arranged in the manner as shown in Figure 1.

The travel of the fluid is indicated by the arrows in Figures 8 and 11. The orifice of variable area for the passage of the fluid is between the movable member and that element which associates with the latter to provide the orifice.

Each movable, fluid flow rate indicating controlling member carries on its upper end a contactor which travels between, coacts with and permanently contacts with a resistance and a conducting strip. The contactor is formed of conducting material and is attached in any suitable manner with that movable member with which it is associated. The contactor extends laterally in opposed directions from the upper end of the movable member and acts as a conducting bridge between the resistance and the conducting strip.

The contactor may be of the form shown in Figures 1 and 2 for coaction with a flat resistance strip and a flat conducting strip and it comprises a body part 72 of oblong contour carrying at each end a yoke 73 in which is journaled a rotatable contacting element. The said elements are indicated at 74, 75, the former coacting with the resistance and the latter with the conducting strip. The contactor may be of the form shown in Figure 4 consisting of a hollow oblong body part 76 open at each end and having slidably mounted therein and extended therefrom a pair of oppositely disposed spring controlled yokes 77, 78 having journaled therein rotatable contacting elements 79, 80 respectively. The controlling spring for the yokes 77, 78 is indicated at 78'. The contactor may be of the form shown in Figure 3 and which corresponds to the form shown in Figure 1, with this exception, that the rotatable contacting elements 81, 81' which correspond to elements 74, 75 respectively have grooved edges for travelling against resistance and conducting strips 69, 69' respectively of circular cross section. The contactor may be of the form shown in Figure 7 consisting of a tubular body part 82 open at each end, a pair of globular contacting elements 83, 84 extending from each end and a controlling spring 85 for said elements arranged within the body part 82. The ends of body part 82 are crimped inwardly as at 86 to retain the elements 83, 84 therein. The contactor may be of the form shown at 87 in Figure 6, which is the same as that shown in Figures 1 and 2 with the exception that the rotatable contacting elements 88, 89 consist of small pinions for engaging the racks provided by the toothed strips 70, 71 respectively.

The various forms of movable contactor shown in Figs. 1 to 6 of the drawings not only cooperate with the associated resistance and conducting strips in the upper portion of the housing to actuate the electrically operated indicator 44, but also serve to guide the orifice changing member 25 in its vertical movements due to variations in the rate of flow of the fluid. The arrangement provides a structure which is unusually free from friction and much more sensitive to minute changes of flow than similar devices in which this guiding feature is not present.

Now with respect to a stationary tapered tube and a movable member of uniform diameter, see Figure 1. As the movable member rises it gradually increases the opening for the fuel to flow through. Therefore the rate of taper, that is how fast the taper increases, governs the rapid increase in flow in proportion to the rise of the movable member. This is one way of increasing the capacity of the meter over a short range of travel; also the opposite, a small rate of flow over a long range of travel, results in a very sensitive and positive reading of small flows.

Now, the movable member must not be too heavy, that is its relative density must not be too great, because it will require too great a pressure to raise it; more particularly the objection is, it would be too hard to start, and when it did start, and moved 1/64 of an inch, about a gallon per hour would be flowing through the small opening at that high pressure required to lift it, where I only want less than a gill to flow at that height of lift.

In many if not all cases, where the movable member must carry some form of a contactor, electrically or otherwise, additional weight is added to the movable member, which must be compensated for in some way, or the meter loses its value.

The loss in value is as follows: too much pressure is required to move the movable member and in many cases where a flow meter is desired there is not sufficient pressure available.

Second, any heavy object whether submerged or not, is very sluggish, slow to get in motion, therefore slow to respond to sudden change of flow.

Third, you do not measure or indicate below a certain quantity of flow, for the pressure must be so great to raise the weight, and as soon as it raises a smallest fraction of an inch, the fluid squirts or rushes through at a great rate, and the amount is far more than the amount you want for that distance of travel of the movable member.

Now to correct those faults, it is accomplished by regulating the relative density of the movable member to suit any weight added by the contactors, pointers etc.; that is I reduce the weight to a minimum, or to suit any condition or structure by providing the member with a cavity or an air chamber of a size which depends upon the weight or relative density to overcome, and above all, if there is not enough material in the movable member to allow the cavity or air chamber, I may attach a body to the movable member which contains the cavity or air chamber. This body can be attached at any place on the movable member where the said body has room to move without engaging with any other part of the meter casing.

Now if the relative density is not enough, and the movable member will not go down, or sink, when the flow diminishes, which might be due to the side pressure, or friction of the contactor, then within the air chamber or cavity, or to the attached body, I add some weight, but just enough to cause the movable body to be heavy enough to overcome the friction, and sink to the bottom, or to the point to indicate a less rate of flow, or the proper rate of flow, and just enough weight to make it heavy enough to start to sink immediately the flow decreases a slight bit and light enough to cause it to start to rise as soon as the flow increases a slight amount and the rise will be had with very little pressure differential.

One example of a weighted buoyant member is shown in Figure 13. The member is designated 91 and the weighting means therefor at 92.

Pressure differential referred to, is the difference between the pressure in the stationary tapered tube, below the lowest point of the movable member and the pressure in the stationary tapered tube, above the lowest point of the movable member. In the case of my flow meter when proper relative density regulation has been adapted, the pressure differential mentioned above will be so small it would be very hard to find means to measure it, nevertheless it is there, and that is one thing I want to do, and do, very nicely.

I have found that by using a movable member of suitable specific or relative density, that the meter parts, or more particularly, the tapered tube and the movable member, can be made of any suitable material, heavy or light, but for accuracy of the meter in all climates, or at all temperatures, only such a material can be employed which possesses contraction and expansion qualities such by way of example as brass, so that when fluid is cold and congeals, and flows slower, the material of the tapered tube and movable member will contract just enough to open up the opening to pass the proper amount of fuel, to correspond to the scale graduations.

If and when the same meter is in a hot climate, or the temperature of the fluid is raised, causing the fluid being metered to thin out, the same temperature rise causes the materials to expand just sufficient to close the opening to only pass the amount to correspond to the scale graduations.

It will be apparent to those skilled in the art that, with a structure of the general type herein disclosed, the various objects of the invention heretofore pointed out, as well as others, may be attained by regulating or controlling the average specific, relative density and buoyancy of the member or element upon which the fluid acts to produce a change in the position of said element in response to a change or changes in the rate of flow of said fluid; by utilizing a measuring orifice the area of which as changed by temperature or other climatic variations can be controlled by virtue of the selection of the material or materials used to form the orifice; by utilizing a measuring orifice the change in area of which due to temperature or other climatic variations can be minimized by virtue of the selection of the materials used to form the orifice; by providing a chamber within the aforesaid member which chamber may contain a solid, liquid, or a gas having a different specific density than the average specific density of the material or materials of which said member is composed; by making the aforesaid member of materials such that the average specific density of said member is of the value required to modify or influence the action of said member in the desired manner; by utilizing an annular measuring aperture the material outlining which is chosen as having a coefficient of expansion such that the area of the orifice varies in the desired manner as aforesaid, or is minimized as aforesaid; by utilizing an annular measuring aperture the materials outlining the inner and outer edges of which being so chosen that each has a different coefficient of expansion resulting in the desired variation or minimizing of the change in the area of said aperture by causes as aforesaid.

What I claim is:—

1. In a flow meter, a fluid movable flow rate indicating controlling member, said member consisting of a cylindrical body of uniform diameter throughout from one end face to its other, said body being completely closed at its ends and having its end faces flat throughout, and a hollow element for connection to a fluid intake, said element gradually increasing in inner diameter from its intake end to its other end, the said other end formed with a closure having an axially arranged aperture through which moves said member, said member and element being formed of materials having like expandible and contractile characteristics to insure the accuracy of the meter in all climates and when subjected to varying temperatures, said element being formed with outlets in proximity to said closure.

2. In a flow meter, a fluid movable flow rate indicating controlling member, said member consisting of a cylindrical body of uniform diameter throughout from one end face to its other, said body being completely closed at its ends and formed with a lengthwise extending sealed chamber for controlling the density thereof to provide for the desired responsive action of said member on variations of the flow rate of the fluid, and a hollow element for connection to a fluid intake, said element gradually increasing in inner diameter from its intake end to its other end, the said other end formed with a closure having an axially arranged aperture through which moves said member, said member and element being formed of materials having like expandible and contractile characteristics to insure the accuracy of the meter in all climates and when subjected to varying temperatures, said element being formed with outlets in proximity to said closure.

3. In a flow meter, an upright housing formed with a fluid inlet and a fluid outlet, a stationary fluid conducting member arranged in and anchored to the housing, said member communicating at one end with said inlet for receiving fluid therefrom, a movable buoyant fluid flow rate indicating controlling member extending into said conducting member from the other end of the latter and having its position controlled by the variations in the rate of flow of the fluid in the conducting member, said controlling member provided with means for obtaining the desired responsive action thereof on variations in the rate of flow of the fluid in the conducting member, said conducting member having its inner face tapered and provided at the said other end thereof with a closure formed with an aperture for the passage of said controlling member, said controlling member being of uniform diameter throughout and coacting with the inner face of said conducting member when moved from one position to another for varying the orifice for the passage of the fluid during the travel of the latter from said inlet to within the housing, and said conducting member formed with outlets in proximity to said closure.

4. In a flow meter, an upright housing formed with a fluid inlet in its lower end and a fluid outlet in its upper end, a tubular fluid conducting member arranged in and anchored to the lower end of the housing and spaced from the upright wall thereof, said member communicating at its lower end with said inlet for receiving fluid therefrom, a movable buoyant fluid flow rate indicating controlling member extending into the upper end of said conducting member and having its position controlled by the variations in the rate of flow of the fluid in the conducting member, said controlling member provided with means for obtaining the desired responsive action thereof on variations in the rate of flow of the fluid in the conducting member, said fluid conducting member being tapered throughout and said controlling member being of uniform diameter throughout and coacting with said fluid conducting member on the movement of the controlling member for varying the orifice for the passage of the fluid during the travel of the latter from said inlet to within the housing, and means actuated by changes in position of said controlling member for visually indicating the rate of flow of the fluid.

5. In a flow meter, an upright housing formed with a fluid inlet and a fluid outlet, a stationary fluid conducting member arranged in and anchored to the housing, said member communicating at one end with said inlet for receiving fluid therefrom, a movable buoyant fluid flow rate indicating controlling member extending into said conducting member from the other end of the latter and having its position controlled by the variations in the rate of flow of the fluid in the conducting member, said controlling member provided with means for obtaining the desired responsive action thereof on variations in the rate of flow of the fluid in the conducting member, said conducting member having its inner face tapered and provided at the said other end thereof with a closure formed with an aperture for the passage of said controlling member, said controlling member being of uniform diameter throughout and coacting with the inner face of said conducting member when moved from one position to another for varying the orifice for the passage of the fluid during the travel of the latter from said inlet to within the housing, said conducting member formed with outlets in proximity to said closure, and means actuated by changes in position of said controlling member for visually indicating the rate of flow of the fluid.

6. In a flow meter, a fluid movable flow rate indicating controlling member comprising a buoyant body of circular cross section, said body being formed lengthwise thereof with a chamber having a permanently closed end adjacent one end of said body, said chamber having its other end open and positioned at the other end of said body, closure means secured to the other end of said body for closing the said other end of said chamber, density controlling means on said member to provide for the desired responsive action of the latter on variations in the rate of flow of the fluid, said closure means being flush with the outer periphery of said body, said member being of circular cross section and of uniform cross sectional diameter at any point from end to end thereof, said member having that end provided by said closure means flat throughout, a fluid conducting member adapted to communicate at one end with a fluid supply, a housing for receiving the fluid conducted by said conducting member and provided with a fluid outlet spaced from the latter, said members being arranged on the interior of the housing and being telescopically arranged relatively to each other and provided with coacting means for varying the orifice for the passage of the fluid during the travel of the latter from said end of the conducting member to within the housing, and said members being formed of materials having like expandible and contractible characteristics to insure the accuracy of the meter in all climates and when subjected to varying temperatures.

7. In a flow meter structure, an upright flow chamber having a fluid inlet in its lower end and a fluid outlet in its upper end, a tubular fluid conducting member projecting into said chamber from said inlet in spaced relation to the upright wall of said chamber to form a reservoir for stagnant fluid between said conducting member and said wall and having an opening extending therethrough from end to end, an orifice changing member freely movable within said conducting member, one of said members having a tapered portion, and cooperating means on said orifice changing member and the upright wall of said chamber for guiding said orifice changing member in its movements longitudinally of said conducting member.

CARROLL P. SHERWOOD.